(12) United States Patent
Yamaguchi

(10) Patent No.: US 8,082,323 B2
(45) Date of Patent: Dec. 20, 2011

(54) MONITORING HOST APPARATUS, IMAGE FORMING APPARATUS, AND ACCESS CONTROL METHOD FOR ACCESS TO THEIR WEB PAGES

(75) Inventor: Kotaro Yamaguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 359 days.

(21) Appl. No.: 11/957,401

(22) Filed: Dec. 14, 2007

(65) Prior Publication Data
US 2008/0155095 A1    Jun. 26, 2008

(30) Foreign Application Priority Data
Dec. 21, 2006    (JP) .................................. 2006-344283

(51) Int. Cl.
G06F 15/16    (2006.01)
G06F 3/12     (2006.01)
G06F 15/173   (2006.01)

(52) U.S. Cl. ........ 709/218; 709/203; 709/217; 709/219; 358/1.15

(58) Field of Classification Search .......... 709/217–219, 709/224–225, 203; 358/1.15
See application file for complete search history.

(56) References Cited

U.S. PATENT DOCUMENTS

| | | | |
|---|---|---|---|
| 6,490,052 B1 * | 12/2002 | Yanagidaira | 358/1.15 |
| 6,791,703 B1 | 9/2004 | Maeda et al. | |
| 7,679,764 B2 * | 3/2010 | Shima | 358/1.15 |
| 7,701,596 B2 * | 4/2010 | Coriale | 358/1.14 |
| 2003/0076522 A1 * | 4/2003 | Simpson et al. | 358/1.14 |
| 2004/0111492 A1 * | 6/2004 | Nakahara et al. | 709/219 |
| 2005/0024671 A1 * | 2/2005 | Abe | 358/1.13 |
| 2006/0066900 A1 * | 3/2006 | Abe et al. | 358/1.15 |
| 2006/0087678 A1 * | 4/2006 | Simpson | 358/1.15 |
| 2006/0112279 A1 * | 5/2006 | Cohen et al. | 713/186 |
| 2006/0217689 A1 | 9/2006 | Dick et al. | |

FOREIGN PATENT DOCUMENTS

JP    2003296277    10/2003
JP    2004078523    3/2004

* cited by examiner

*Primary Examiner* — Ashok Patel
*Assistant Examiner* — Linglan Edwards
(74) *Attorney, Agent, or Firm* — Fitzpatrick, Cella, Harper & Scinto

(57) ABSTRACT

The invention realizes access authentication by a simple method using an existing hardware construction while assuring security when a user accesses a monitoring service display screen of a monitoring host from a client PC. A WEB page provided by a monitoring host apparatus is accessed from a WEB page intended for an administrator using an image forming apparatus, a device serial number of the image forming apparatus is used for authentication, thereby omitting an authentication operation using a log-in/account. Thus, problems experienced by the user or the administrator of the monitoring host in managing the log-in/account and a password are minimized.

12 Claims, 13 Drawing Sheets

FIG. 4

| DEVICE SERIAL NO. | USER ID | ACCESS PERMISSION FLAG | ACCESS PERMISSION TIME |
|---|---|---|---|
| 4EZ07F149 | Customer001 | 1 | 2006/09/20 15:40 |
| 4GUP240F1 | Customer001 | 1 | – |
| 3V945JT60 | Customer002 | 0 | – |
| Q25JAT938 | Customer003 | 1 | 2006/09/10 10:15 |
| ⋮ | ⋮ | ⋮ | ⋮ |

FIG. 5

```
<?xml version='1.0' encoding='UTF-8'?>
<SOAP-ENV:Envelope
xmlns:SOAP-ENV="http://schemas.xmlsoap.org/soap/envelope/"
xmlns:xsi="http://www.w3.org/2001/XMLSchema-instance"
xmlns:xsd="http://www.w3.org/2001/XMLSchema">
<SOAP-ENV:Body>
<ns1:confirmAccess xmlns:ns1="server"
SOAP-ENV:encodingStyle="http://schemas.xmlsoap.org/soap/encoding/">
<device xsi:type="ns2:deviceIdentityType"
xmlns:ns2="http://www.xxxx.com/maintenance">
<serialNumber xsi:type="xsd:string">4EZ07F149</serialNumber>
</device>
</ns1:confirmAccess>
</SOAP-ENV:Body>
</SOAP-ENV:Envelope>
```

FIG. 7

MONITORING SERVICE DISPLAY SCREEN

| | SERIAL NO. | DEVICE NAME | PRODUCT NAME | SETTING PLACE |
|---|---|---|---|---|
| DEVICE LIST | 4EZ07F149 | xxxxxxxxx | xxxxx | OA CORNER |
| COUNTER INFORMATION | 4GUP240F1 | xxxxxxxxx | xxxxx | OA CORNER |
| CONSUMABLES INFORMATION | | | | |
| FAULT INFORMATION | | | | |
| OTHERS | | | | |

701

MONITORING HOST APPARATUS, IMAGE FORMING APPARATUS, AND ACCESS CONTROL METHOD FOR ACCESS TO THEIR WEB PAGES

BACKGROUND OF THE INVENTION

1. Field of the Invention

The present invention relates to a monitoring host apparatus, an image forming apparatus, a monitoring system of the image forming apparatus including an information processing apparatus, and an access control method for an access to their WEB pages.

2. Description of the Related Art

In recent years, a system for monitoring, from a remote place, operating states of image forming apparatuses connected to a LAN (Local Area Network) and image forming apparatuses such as a printer and the like exists. In such a system, a plurality of image forming apparatuses and a monitoring host for monitoring those apparatuses mutually communicate through the LAN, a WAN (Wide Area Network), or the Internet. Each image forming apparatus periodically notifies the monitoring host of information such as the number of print sheets and the like and also notifies the monitoring host of information indicative of a jam, an alarm, an error, and the like at timing of the occurrence of them.

On the monitoring host side which received the notifications, the contents of such notifications are accumulated and managed, an operating situation of the image forming apparatus is discriminated, and a countermeasure and the like against a fault which occurred in the image forming apparatus are also performed.

The information accumulated and managed in the monitoring host can be browsed from the outside by using a WEB browser or the like which is operating in a client PC. In such a case, generally, an administrator of the monitoring host forms an authentication account/password for browsing and provides it to a reader and the user accesses the monitoring host from an authentication display screen 702 in FIG. 13 by using the authentication account (user name)/password.

A method whereby access authentication between the user and a server is made through an apparatus which mediates the authentication has been proposed (for example, refer to Japanese Patent Application Laid-Open No. 2004-078523). According to such a method, organism feature information to specify the user and apparatus information to mediate the authentication are preliminarily managed on the server side. The organism feature information input from the user and the apparatus information of the apparatus to mediate the authentication are combined and the access authentication is made on the server side.

However, in the case where the authentication display screen 702 in FIG. 13 is used as a method of authenticating the access to the monitoring host from the user as in the related art, the administrator on the monitoring host side needs to issue the authentication account/password every user and perform a maintenance of them. The user also needs to continuously manage the issued authentication account (user name)/password without forgetting them. Those operations are troublesome to both of the administrator and the user. Particularly, when the number of users is large, an operation load on the administrator of the monitoring host is very large.

In the case of using the authenticating method using the organism feature information as disclosed in Japanese Patent Application Laid-Open No. 2004-078523 mentioned above, at least the managing operation of the account and the password on the user side is unnecessary. However, to send the organism feature information to the monitoring host side, a special apparatus for reading the organism information is necessary. In the case where such an authenticating method is used in the general monitoring system of the image forming apparatus, it is not practical since high costs are required.

SUMMARY OF THE INVENTION

It is an object of the invention to realize an access authentication by a simple method by using an existing hardware construction while assuring a security when the user accesses a monitoring service display screen of a monitoring host from a client PC.

According to the invention, in the case where a WEB page which is provided by a monitoring host apparatus is browsed from a WEB page for an administrator which is provided by an image forming apparatus, a device serial number of the image forming apparatus is used for the authentication, thereby omitting the authenticating operation using log-in/account.

Thus, a troublesomeness for the user or the administrator of the monitoring host to manage the log-in/account or a password can be omitted.

To accomplish the above object, according to the first aspect of the invention, there is provided a monitoring host apparatus which is communicatably connected to an image forming apparatus and a client apparatus having a WEB browser through a communicating medium, comprising: a WEB server configured to provide a WEB page; an access information managing unit configured to associatively manage peculiar information, access permission/inhibition information, and access requesting time information of each of a plurality of image forming apparatuses; a peculiar information receiving unit configured to receive the peculiar information of the image forming apparatus from the image forming apparatus; an access permission/inhibition notifying unit configured to notify the image forming apparatus corresponding to the received peculiar information of permission/inhibition of an access to the WEB page; and an access control unit configured to control an access to the WEB page based on the information managed by the access information managing unit when the access to the WEB page from the client apparatus is received, wherein when the peculiar information receiving unit receives the peculiar information from the image forming apparatus, the access permission/inhibition notifying unit notifies the image forming apparatus of the permission/inhibition of the access based on the access permission/inhibition information of the image forming apparatus corresponding to the peculiar information managed by the access information managing unit, the access information managing unit stores the access requesting time information in correspondence to the peculiar information of the image forming apparatus, and the access control unit controls the access to the WEB page based on the stored access requesting time information.

To accomplish the above object, according to the second aspect of the invention, there is provided an image forming apparatus having a WEB server which is communicatably connected to a monitoring host apparatus having a WEB server and a client apparatus having a WEB browser through a communicating medium, comprising: a WEB page data transmitting unit configured to receive an access from the client apparatus to the WEB server held in the image forming apparatus and transmit WEB page data including access request information indicative of an accessing request to the monitoring host apparatus to the client apparatus; a peculiar information notifying unit configured to notify the monitoring host apparatus of peculiar information of the image forming apparatus when the client apparatus has referred to the access request information included in the WEB page data; an access permission/inhibition receiving unit configured to receive permission/inhibition of an access to the WEB server held in the monitoring host apparatus from the monitoring host apparatus; and a redirect information transmitting unit configured to, when the access permission/inhibition receiving unit receives the access permission, transmit redirect information indicative of a redirect to the WEB server held in the monitoring host apparatus to the client apparatus as a response to the reference to the access request information.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a diagram illustrating an information management table which is managed in the monitoring host of the invention.

FIG. 5 is a diagram illustrating a data format of information which is notified to the monitoring host from the image forming apparatus of the invention.

FIG. 7 is a diagram illustrating a monitoring service display screen of a WEB page which is provided by the monitoring host of the invention.

DESCRIPTION OF THE EMBODIMENTS

Figure 1:
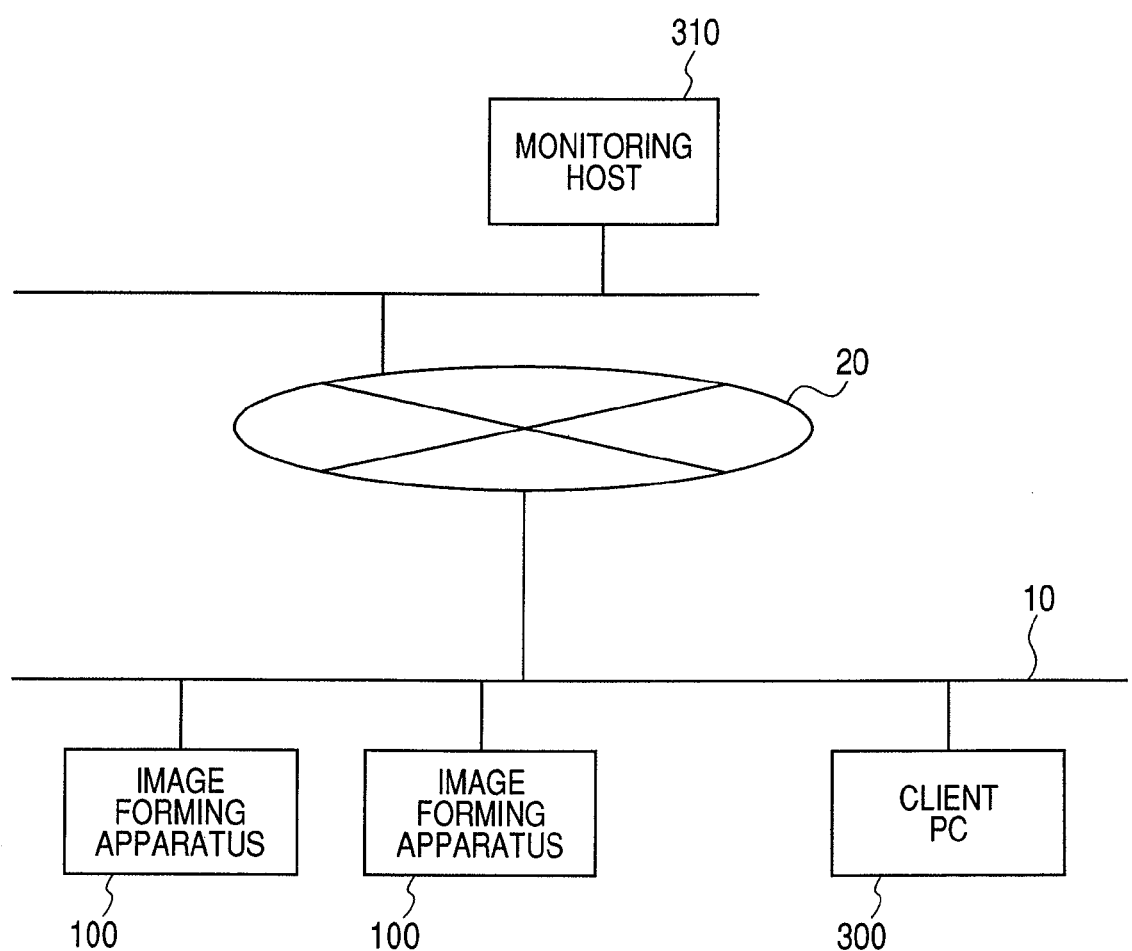
FIG. 1 illustrates a system constructional diagram in the invention.

Preferred embodiments of the present invention will now be described in detail in accordance with the accompanying drawings.

Exemplary embodiments of the invention will be described hereinbelow with reference to the drawings.

It is assumed that, in the description, common or similar portions in the embodiments are designated by the common reference numerals and an overlapped description is omitted unless otherwise specified.

First Embodiment

FIG. 1 is a diagram illustrating a whole system according to an embodiment of the invention.

In the diagram, a monitoring host (monitoring server) 310 unitarily monitors an operating state of an image forming apparatus and communicates with an image forming apparatus 100 and a client computer 300 (hereinbelow, referred to as a client PC), which will be described hereinbelow, through an Internet 20.

A local network (hereinbelow, referred to as an Intranet) 10 on the user side is provided. The image forming apparatus 100 and the client PC 300 are mutually connected through the Intranet 10.

The image forming apparatus 100 notifies the monitoring host 310 of the following information through the Internet 20: operating mode settings; a count value showing the number of print sheets; a parts count value showing an operation amount of each part; operation information such as an operation log; and fault information such as service call error, jam, alarm, or the like. The image forming apparatus 100 also receives various requests (an information obtaining request, a communicating schedule setting request, a firmware updating request, and the like) from the monitoring host 310. As a communicating unit in this instance, for example, a protocol such as HTTPS (Hypertext Transfer Protocol Security) or SOAP (Simple Object Access Protocol) is used.

As an image forming apparatus 100, which will be described here, specifically speaking, the following apparatuses can be mentioned: a digital hybrid image forming apparatus in which a printing function, a copying function, a facsimile function, a transmitting function (E-mail, FTP, etc.), and the like have been integrated; a printer; a scanner; a facsimile; and the like.

Figure 2:
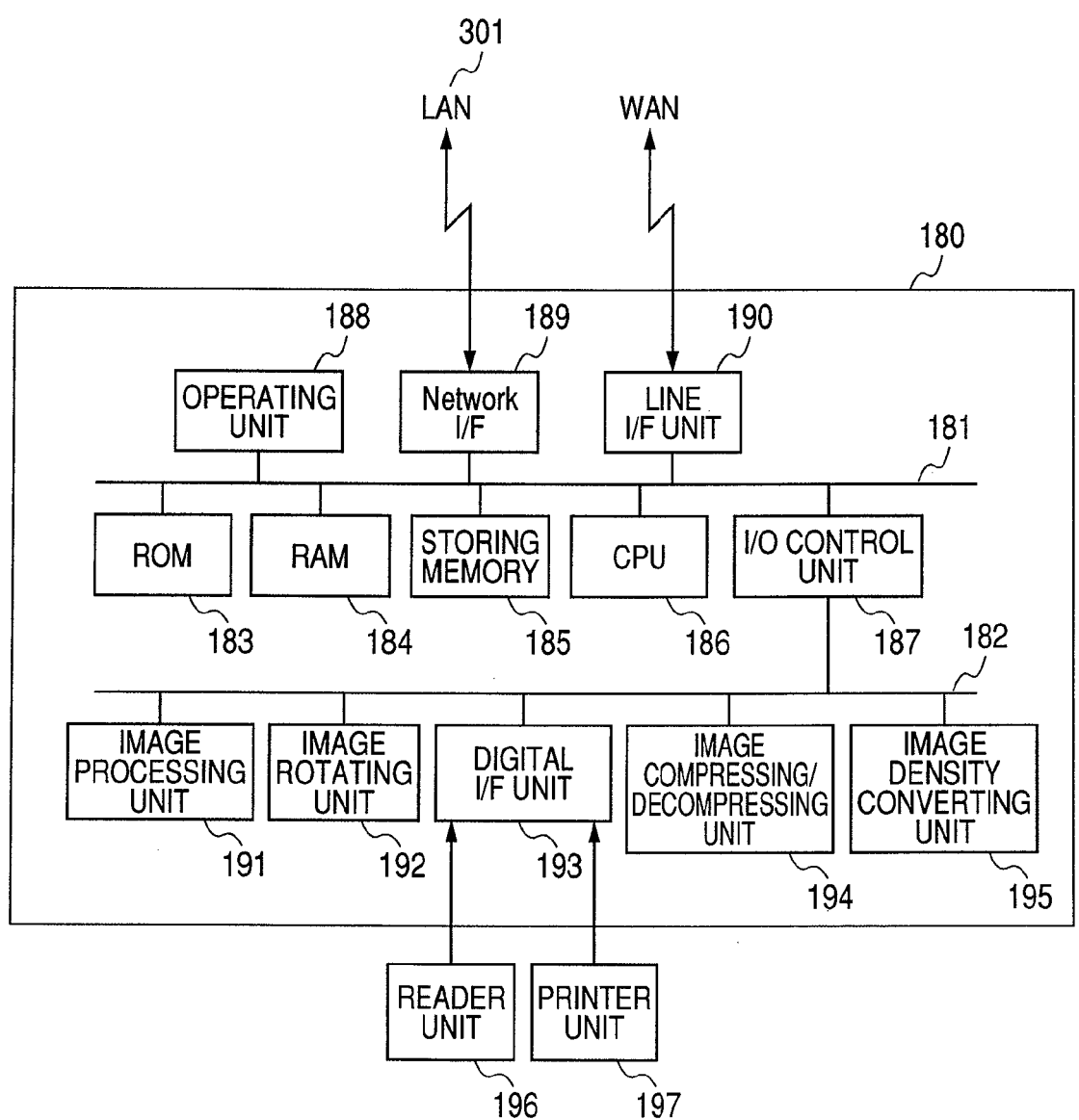
FIG. 2 illustrates a block diagram of a controller of an image forming apparatus of the invention.

FIG. 2 is a block diagram illustrating a construction of a controller 180 for controlling the whole image forming apparatus 100.

Component elements of the controller 180 are connected to a system bus 181 and an image bus 182. A control program of the image forming apparatus 100 has been stored in a ROM 183 and is executed by a CPU 186. A RAM 184 is a work memory area for executing the program and is also an image memory for temporarily storing image data. A storing memory 185 is a non-volatile memory in which the following information is stored: various operating mode settings; an address book; the count value showing the number of print sheets; the parts count value showing the operation amount of each part; the operation log; and the fault information such as service call error, jam, alarm, or the like. A setting which needs to be held after the image forming apparatus 100 was reactivated is also included in the various operating mode settings. A network I/F 189 is an interface unit for connecting the controller 180 to the LAN and communicates with a base point monitoring apparatus 200 through the LAN. A line I/F unit 190 is connected to a public telephone network such as an ISDN, is controlled by the communication control program in the ROM 183, and transmits and receives data to/from a remote terminal through an ISDN I/F, a modem, or an NCU (Network Control Unit). The transmission and reception of the facsimile apparatus are also executed by using the line I/F unit 190. A display unit and a key input unit have been built in an operating unit 188 and are controlled by the CPU 186. The operator makes various setting instructions and operating/stopping instructions regarding the scanner reading operation and the print output through the key input unit. The above component elements are arranged on the system bus 181.

An I/O control unit 187 is a bus bridge for connecting the system bus 181 to the image bus 182 for transferring the image data at a high speed. The image bus 182 is constructed by a PCI bus or IEEE1394. The following devices are arranged on the image bus 182. A digital I/F unit 193 connects a reader unit 196 and a printer unit 197 of the image forming apparatus 100 to the controller 180 and converts the image data by one of a synchronous system and an asynchronous system. Information detected by the foregoing various sensors arranged at the positions in the reader unit 196 and the printer unit 197 is sent to the system bus 181 through the digital I/F unit 193 and the I/O control unit 187. An image processing unit 191 executes correction/modification/edition to the input and output image data. An image rotating unit 192 rotates the image data. An image compressing/decompressing unit 194 executes a compressing/decompressing process of JPEG to the multivalue image data or executes a compressing/decompressing process of JBIG/MMR/MR/MH to the binary image data. An image density converting unit 195 executes a resolution conversion or the like to the image data for output.

By the control program which is executed by the CPU 186, the CPU 186 reads out the information in the storing memory 185 and transmits to the monitoring host 310 through the network I/F 189. The information in the storing memory 185 includes: the various operating mode settings; the count value showing the number of print sheets; the parts count value showing the operation amount of each part; the operation log; and the fault information such as service call error, jam, alarm, or the like. At this time, in the CPU 186, the read-out information is mainly classified into the two types of information and timing for transmitting the information to the monitoring host 310 is changed, respectively.

One of the two types is information regarding the fault such as service call error, jam, alarm, or the like occurring on the image forming apparatus 100 side. Since instantaneousness is required for those information, the CPU 186 transmits them to the monitoring host 310 immediately after the fault occurred.

The other is information such as various operating mode settings, count value showing the number of print sheets, parts count value showing the operation amount of each part, operation log, and the like. The CPU 186 periodically transmits them to the monitoring host 310 according to a predetermined communicating schedule.

In the controller 180, a WWW (World Wide Web) server program is operating and the information stored in the storing memory 185 can be browsed from a WEB browser which operates on the client PC 300.

Figure 3:
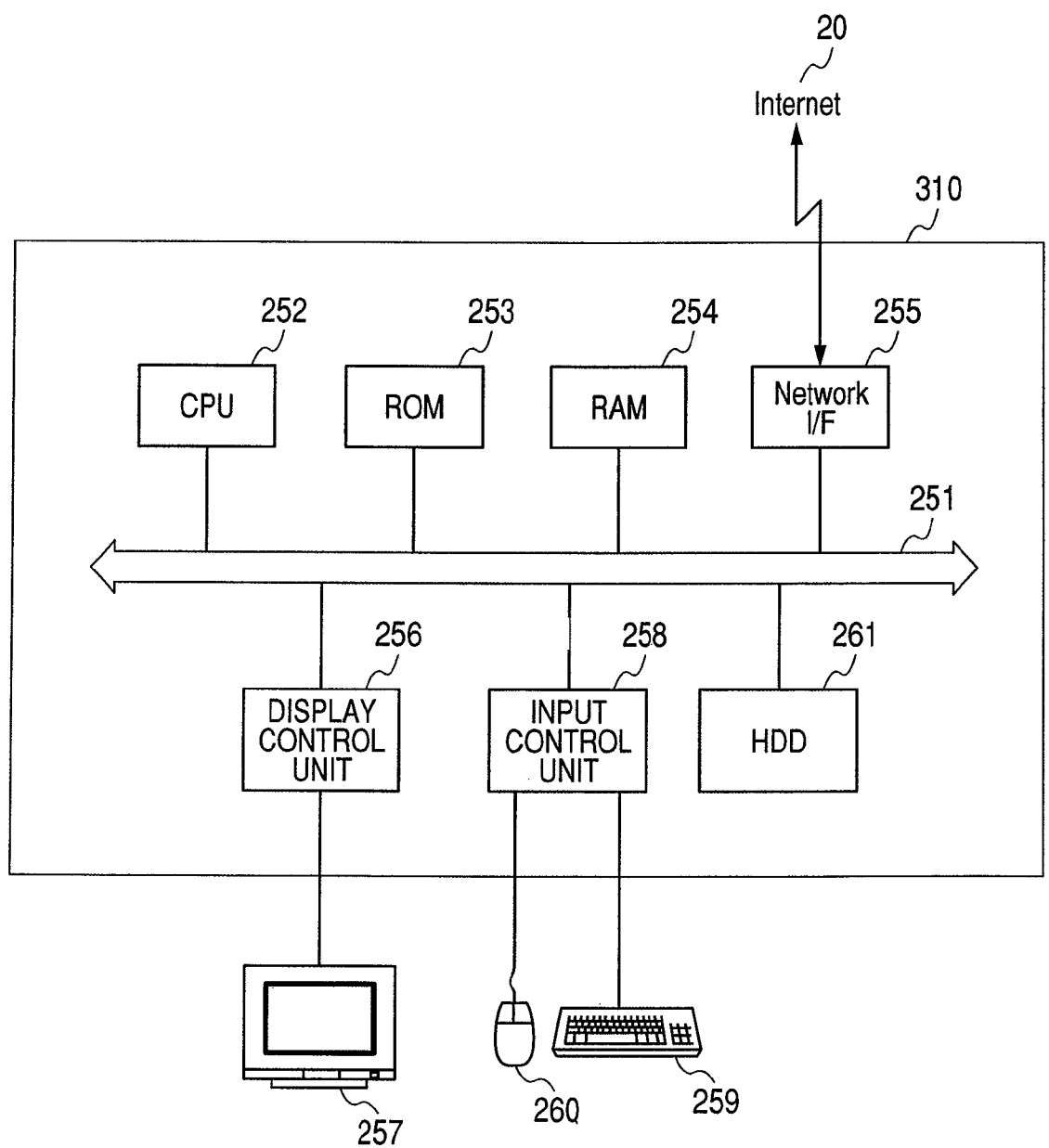
FIG. 3 illustrates a block diagram of a monitoring host of the invention.

FIG. 3 is a block diagram illustrating a hardware construction of the monitoring host 310.

The monitoring host 310 has such a construction that a CPU 252, a ROM 253, a RAM 254 as a work memory, a network I/F unit 255 for making communication, a display control unit 256, an input control unit 258, and an HDD 261 are connected to a system bus 251. The CPU 252 controls the whole monitoring host 310. The ROM 253 is a read only memory in which a boot program necessary to activate the system has been stored. The RAM 254 is a work memory which is necessary when the CPU 252 executes the program. The network I/F unit 255 communicates with the image forming apparatus 100 and the client PC 300 through the Internet 20. The program which is executed by the CPU 252, operation information of the image forming apparatus 100, and the like are stored in the HDD 261. A display device 257 is connected to the display control unit 256. Input devices 259 and 260 are connected to the input control unit 258. The operator who manages the monitoring host 310 confirms the operating state of the image forming apparatus 100 and inputs various settings through those input/output devices.

The monitoring host 310 always receives the information transmitted from the image forming apparatus 100 as mentioned above from the network I/F unit 255 through the Internet 20 and stores into the HDD 261. The WWW server program is operating in the monitoring host 310. The information stored in the HDD 261 can be browsed from the WEB browser which is operating in the client PC 300.

FIG. 4 schematically illustrates an information management table 401 of the image forming apparatus 100 held in the HDD 261 by the monitoring host 310. A serial number which can unconditionally specify the image forming apparatus 100 serving as a monitoring target is stored in a device serial number column 402 in the information management table. This serial number is peculiar information of the image forming apparatus. A user ID which can unconditionally specify the user who owns each image forming apparatus 100 is stored in a user ID column 403. A flag to set information, every user ID, showing whether or not the user can access the WWW server of the monitoring host 310 by using the client PC 300 is stored in an access permission flag column 404. When such a flag is equal to "1", this means that the user can access the WWW server. If the flag is equal to "0", this means that the user cannot access the WWW server. The contents of the device serial number column 402, user ID column 403, and access permission flag column 404 are input/managed by the operator. An access permission time column 405 will be described in detail hereinafter. An initial value of the access permission time column 405 is "NULL". A "NULL" value denotes one of a state where no data is included and an empty character string of a length 0. The time shown in the access permission time column 405 is also called "access requesting time information".

FIG. 5 illustrates an example of data in an XML format which is used by the image forming apparatus 100 when it communicates with the monitoring host 310. In this instance, the image forming apparatus 100 communicates with the monitoring host by the HTTPS/SOAP. The contents of FIG. 5 will be described in detail hereinafter.

Figure 6:
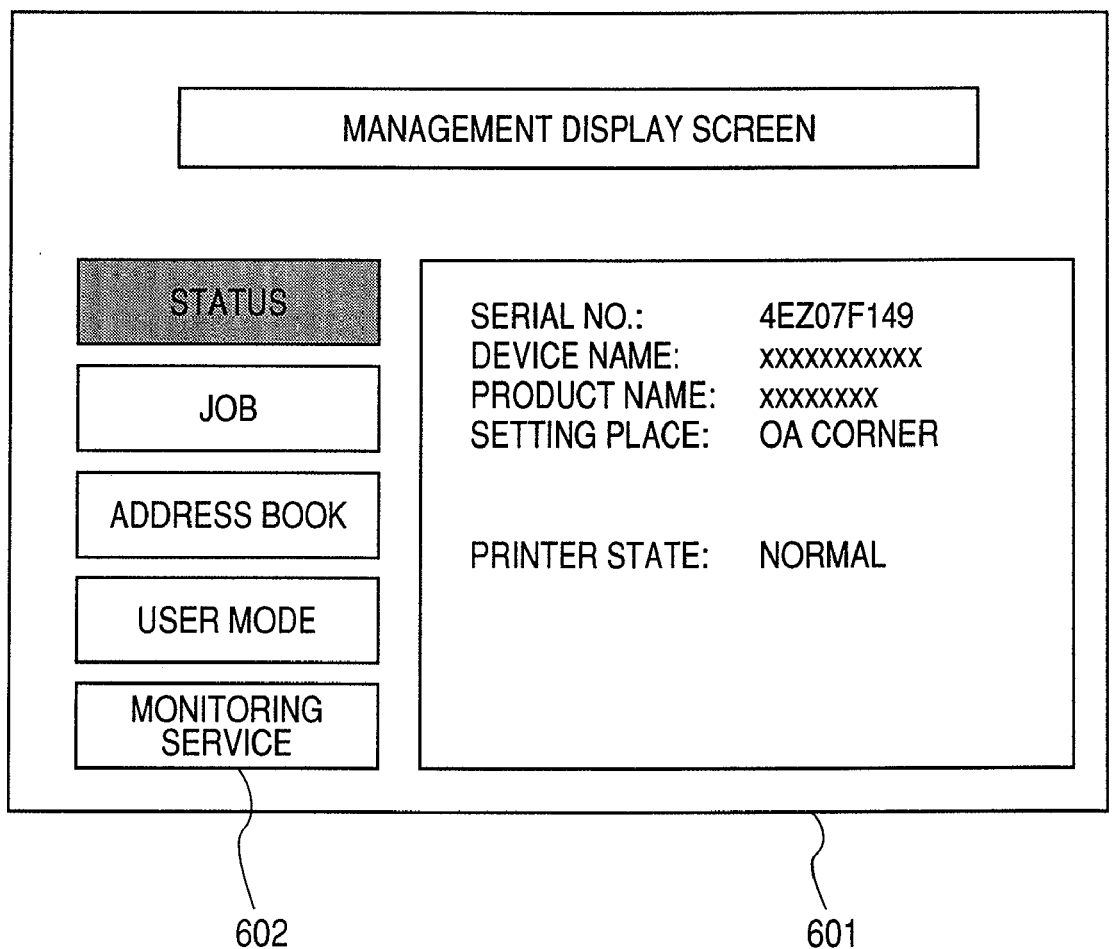
FIG. 6 is a diagram illustrating a management display screen of a WEB page which is provided by the image forming apparatus of the invention.

FIG. 6 illustrates an example of a management display screen 601 which is displayed when the user accesses the WEB page of the WWW server which is operating in the controller 180 of the image forming apparatus 100 mentioned above from the WEB browser which is operating in the client PC 300. The user can browse and edit the operating state of the image forming apparatus 100, a job processing situation of a job such as printing or the like, the address book, and the user mode setting through the management display screen 601. The management display screen 601 is a WEB page for displaying the state of the image forming apparatus. The WEB page data is transmitted from the WEB server to the WEB browser in response to a request of the client PC and the WEB page is displayed. On the management display screen 601, a URL for accessing the WWW server which is operating in the monitoring host 310 mentioned above can be also displayed and confirmed.

FIG. 7 illustrates an example of a monitoring service display screen 701 which is displayed when the user accesses the WWW server which is operating in the monitoring host 310 mentioned above from the WEB browser which is operating in the client PC 300.

Through the monitoring service display screen 701, the user can confirm all of the image forming apparatuses 100 held in, for example, the intra-LAN or Intranet by displaying a list of them. The user can browse the following monitoring information of each image forming apparatus 100: the information regarding the count value showing the number of print sheets; the information regarding the fault such as service call error, jam, alarm, or the like; stock information of consumables such as toner and ink; and the like. The monitoring service display screen 701 is a WEB page for displaying the monitoring information of a plurality of image forming apparatuses 100.

Figure 8:
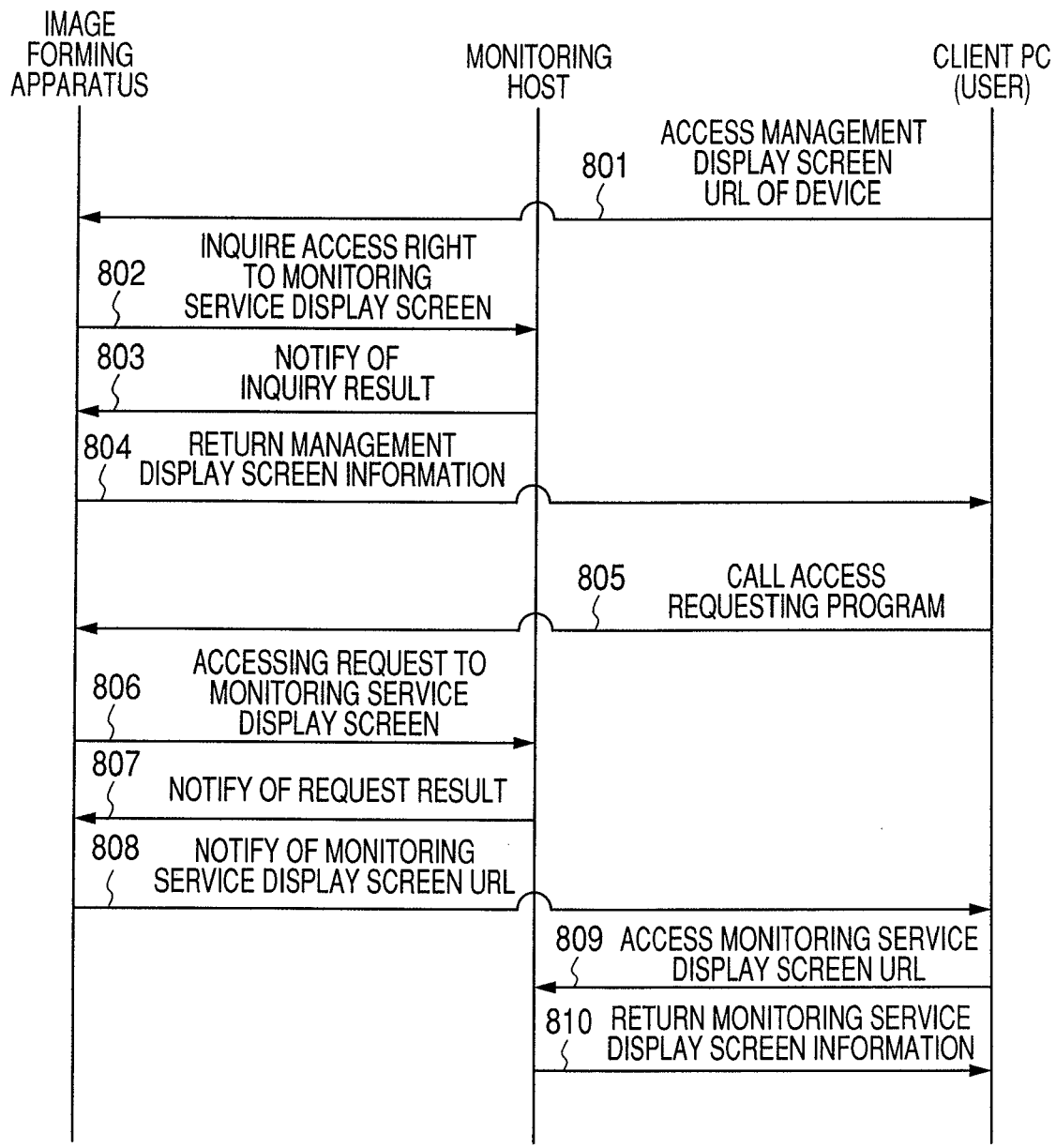
FIG. 8 is a diagram illustrating a communicating sequence among the image forming apparatus, the monitoring host, and a client PC of the invention.

FIG. 8 is a diagram illustrating a processing sequence when the monitoring service display screen 701 which is provided by the monitoring host 310 is displayed by the WEB browser which is operating in the client PC 300. The contents of the invention will be described in detail hereinbelow with reference to this diagram.

First, the user who wants to access the WWW server on the monitoring host 310 and display the monitoring service display screen 701 operates the WEB browser which is operating in the client PC 300 in step 801. The management display screen of an arbitrary image forming apparatus 100 in the Intranet 10 which can be accessed is accessed from the WEB browser of the client PC 300. In the embodiment, an explanation will be made on the assumption that the management display screen of the image forming apparatus 100 whose serial number is equal to "4EZ07F149" is accessed.

Assuming that an IP address in the Intranet 10 of the image forming apparatus 100 is equal to "ADDRESS", the URL of the management display screen is always equal to "http://ADDRESS/index.html". Therefore, the user can access the management display screen of the image forming apparatus 100 so long as he knows the IP address in the Intranet 10 of the image forming apparatus 100. In other words, only the user who knows the IP address in the Intranet 10 of the image forming apparatus 100 can designate the IP address and directly access the image forming apparatus 100. Only the user can access the management display screen of the image forming apparatus 100 by using the WEB browser of the client PC 300.

The URL can be also described by a host name by using a DNS in place of the IP address. In this case, only the user who knows a specific host name or pass name can access the management display screen of the image forming apparatus 100.

In next step 802, the image forming apparatus 100 inquires the presence or absence of an access right to the monitoring service display screen from the monitoring host 310. This inquiry is made by using the HTTPS/SOAP communication and the data of the XML format illustrated in FIG. 5 is transmitted.

<ns1:confirmAccess xmlns:ns1="server" ~ in
<ns1:confirmAccessxmlns:ns1="server"SOAP
ENV:encodingStyle="http://schemas.xmlsoap.org/soap/encoding/"> in the data shows that the HTTPS/SOAP communication is the inquiry command of the access right. Similarly, <serialNumber
xsi:type="xsd:string">4EZ07F149</serialNumber> in the data in FIG. 5 shows that the serial number of the image forming apparatus 100 as a data transmitting source is equal to "4EZ07F149".

Figure 9:
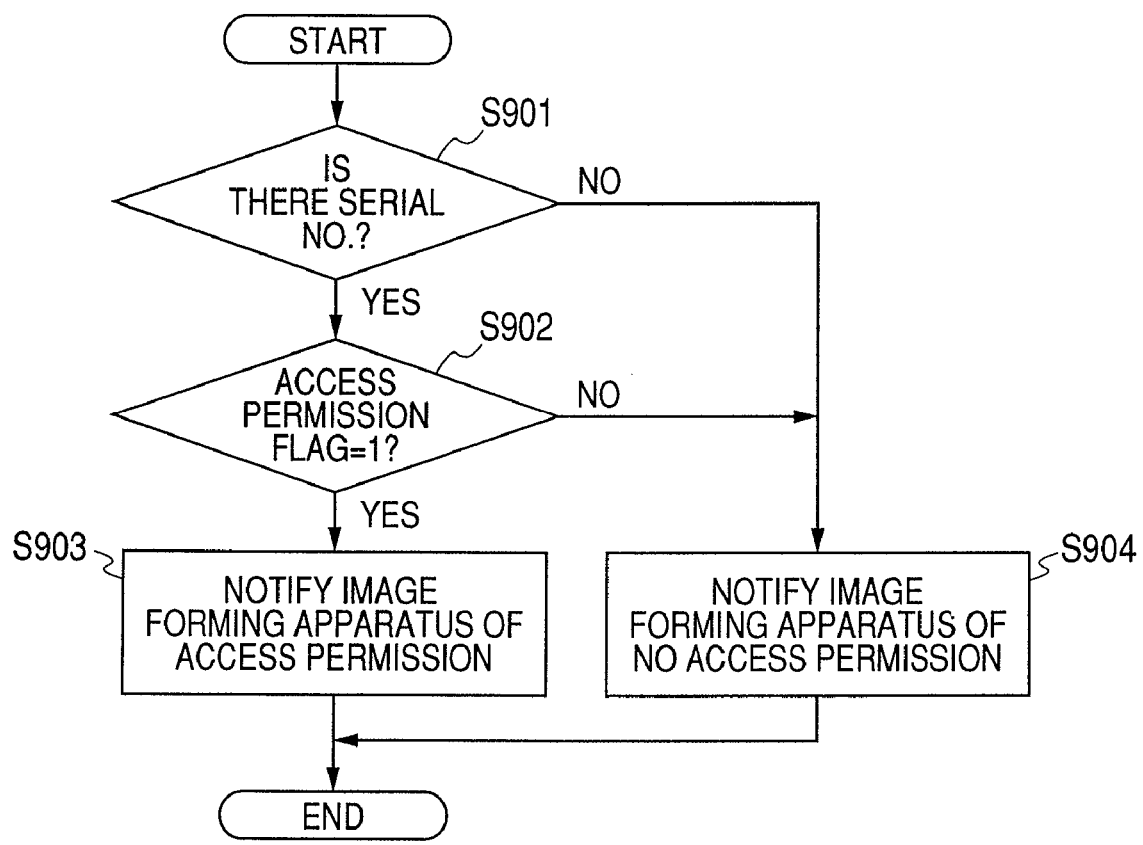
FIG. 9 is a flowchart illustrating processes on the monitoring host side upon reception of an access right inquiry from the image forming apparatus of the invention.

First, the monitoring host 310 which received the inquiry command of the access right in step 802 analyzes the received data of the XML format and recognizes that it is the inquiry command of the access right to the monitoring service display screen. Further, it is recognized that the command transmitting source is the image forming apparatus 100 whose serial number is equal to "4EZ07F149". Subsequently, the presence or absence of the access right is discriminated according to a processing flow illustrated in FIG. 9. A discrimination result is returned to the image forming apparatus 100 in step 803. Specifically speaking, whether or not the serial number "4EZ07F149" recognized exists in the device serial number column 402 in the information management table 401 is discriminated in step 901. If the serial number "4EZ07F149" exists, a state of the access permission flag is confirmed with reference to the access permission flag column 404 of the relevant record in step 902. If the access permission flag is equal to "1", a message showing the presence of the access right is returned to the image forming apparatus 100 in step 903 as response data of the HTTPS/SOAP communication. If the discrimination result is NO in step 901 or 902 mentioned above, a message showing the absence of the access right is returned to the image forming apparatus 100 in step 904 as response data of the HTTPS/SOAP communication.

The image forming apparatus 100 which received the inquiry result from the monitoring host 310 in step 803 in FIG. 8 forms HTML data of the management display screen 601. In this instance, if a result indicative of the presence of the access right is received, the image forming apparatus 100 forms HTML data added with a "monitoring service" link 602. If a result indicative of the absence of the access right is received, the image forming apparatus 100 forms HTML data excluding the "monitoring service" link 602. In addition to such a condition that the excluded "monitoring service" link 602 in FIG. 6 is not referred to, such a link 602 can be displayed in gray so as to indicate that it cannot be selected, or the HTML data can be also formed so that the link button 602 itself is not displayed. In subsequent step 804, the formed HTML data is returned to the client PC 300 as a response to the access from the client PC 300 in step 801 mentioned above. The client PC 300 which received such a response displays the management display screen 601 onto the WEB browser. Therefore, only the users whose access to the monitoring service display screen has been permitted on the monitoring host 310 side can refer to the management display screen 601 added with the "monitoring service" link 602.

The processes in steps 802 to 803 mentioned above are not always necessary for the purpose of accomplishing the object of the invention. That is, as a response to the access from the client PC 300 in step 801, the HTML data added with the "monitoring service" link 602 can be also always formed and returned to the client PC 300 in step 804.

Subsequently, the user clicks the "monitoring service" link 602 on the management display screen 601 displayed on the browser of the client PC 300. As shown hereinbelow, the HTML data constructing the management display screen 601 is described so as to call a predetermined program of the image forming apparatus 100 side upon clicking of the "monitoring service" link 602.

```
<a href="http://ADDRESS/app/requestAccess.jsp"> <img
    src="images/service1.gif"name="ms"></a>
```

Therefore, when the user clicks the "monitoring service" link 602, in step 805, the browser operates so as to call the predetermined program of the image forming apparatus 100 according to the above description. The predetermined program "requestAccess.jsp" in the embodiment is a program (module) for executing the access requesting process of the access to the monitoring service display screen for the monitoring host 310.

The image forming apparatus 100 in which such a program has been called makes the accessing request to the monitoring service display screen for the monitoring host 310 in subsequent step 806. Such a request is made by using the HTTPS/SOAP communication in a manner similar to step 802 mentioned above. Different from step 802 mentioned above, a command described in the data of the XML format which is transmitted at this time is a command showing the accessing request to the monitoring service display screen as shown below.

```
<ns1:requestAccess xmlns:ns1="server"
SOAPENV:encodingStyle=http://schemas.xmlsoap.org/soap/encoding/>
```

Figure 10:
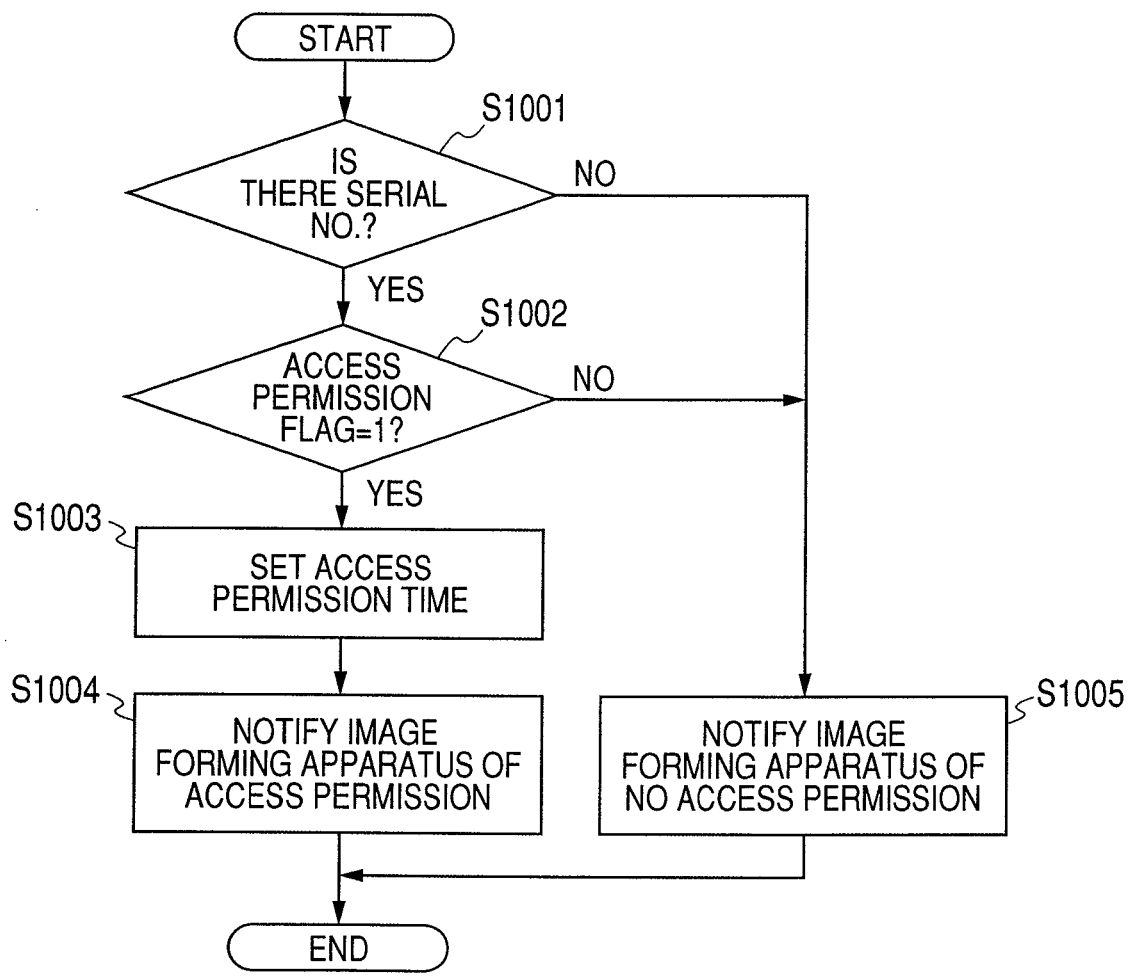
FIG. 10 is a flowchart illustrating processes on the monitoring host side upon reception of an accessing request from the image forming apparatus of the invention.

The monitoring host 310 which received the access request command analyzes the received data of the XML format in a manner similar to the foregoing process and recognizes that it is the access request command to the monitoring service display screen. Further, it is recognized that the command transmitting source is the image forming apparatus 100 whose serial number is equal to "4EZ07F149". Subsequently, a process corresponding to the access request command is executed according to a processing flow illustrated in FIG. 10. A discrimination result is returned to the image forming apparatus 100 in step 807. Specifically speaking, whether or not the serial number "4EZ07F149" recognized exists in the device serial number column 402 in the information management table 401 is discriminated in step 1001. If the serial number "4EZ07F149" exists, the state of the access permission flag is confirmed with reference to the access permission flag column 404 of the relevant record in step 1002. If the access permission flag is equal to "1", the present time is stored in the access permission time column 405 of the relevant record in step 1003. Further, in step 1004, a message showing the permission of the access to the image forming apparatus 100 is returned as response data of the HTTPS/SOAP communication. If the discrimination result is NO in step 1001 or 1002 mentioned above, a message showing the refusal of the access to the image forming apparatus 100 is returned in step 1005 as response data of the HTTPS/SOAP communication.

The image forming apparatus 100 which received the access request result from the monitoring host 310 in step 807 in FIG. 8 forms response data to the client PC 300 according to the contents of the access request result.

If the result showing the permission of the access is received, the HTML data which instructs the browser on the client PC 300 to access the monitoring host 310 is formed. Specifically speaking, the HTML data which instructs the redirect to the monitoring service display screen of the monitoring host 310 is formed by using the following metatag. "redirect" denotes that it is notified that the URL has been changed. The WEB browser of the client PC reads out the URL of a redirect destination. In this instance, a character string in which the serial number "4EZ07F149" of its own apparatus has been encrypted (encoded) is added, as a URL parameter, after the URL which designates the redirect destination. In the following example, a portion of "?id=82va134rk2u" corresponds to such a character string. In subsequent step 808, the formed HTML data is returned to the client PC 300 as a response to the access from the client PC 300 in step 805 mentioned above.

```
<meta http-equiv="Refresh" content="0;URL=
https://www.monitor.com/login.jsp?id = 82va134rk2u">
```

Figure 12:
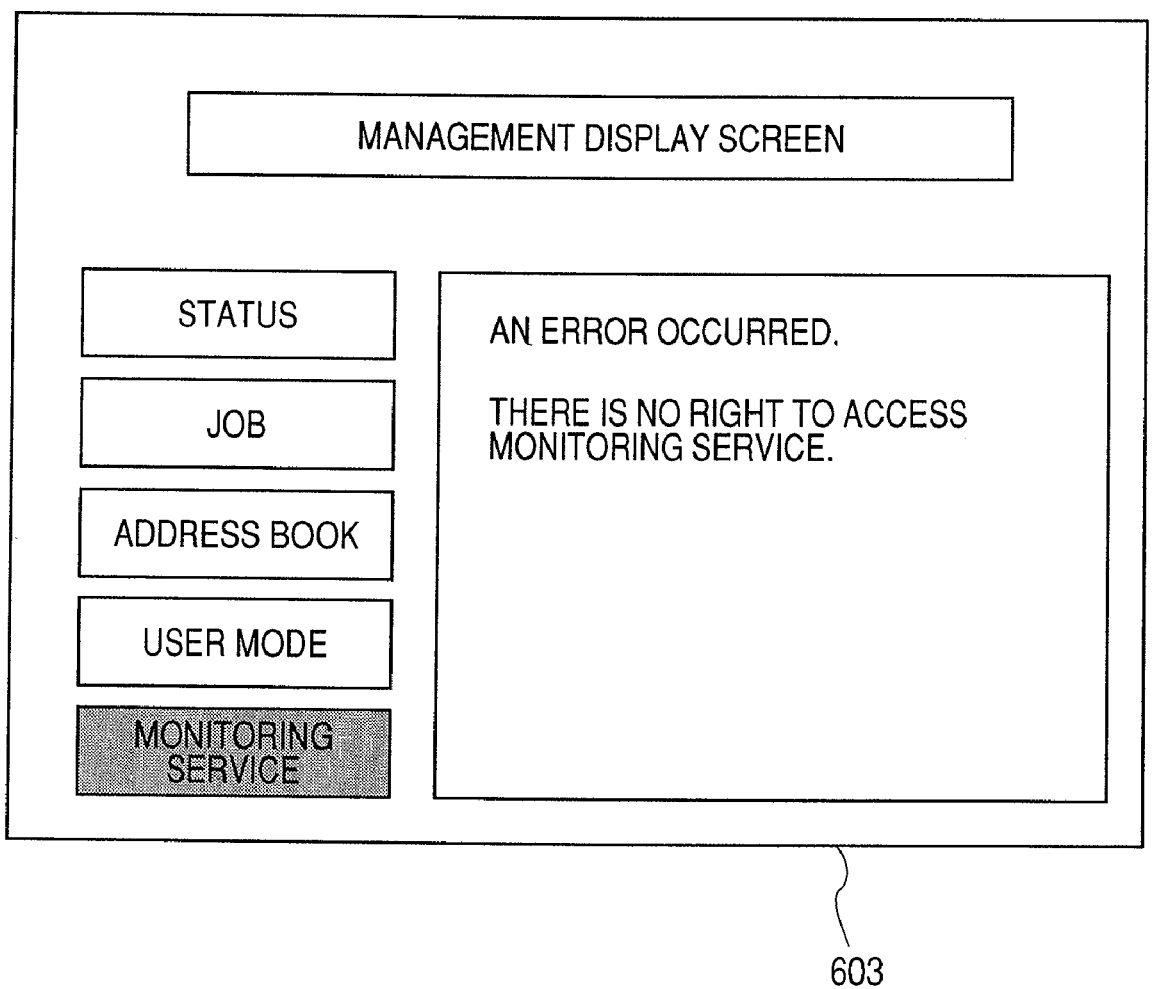
FIG. 12 is a diagram illustrating an error indication on the monitoring service display screen of the invention.
Figure 13:
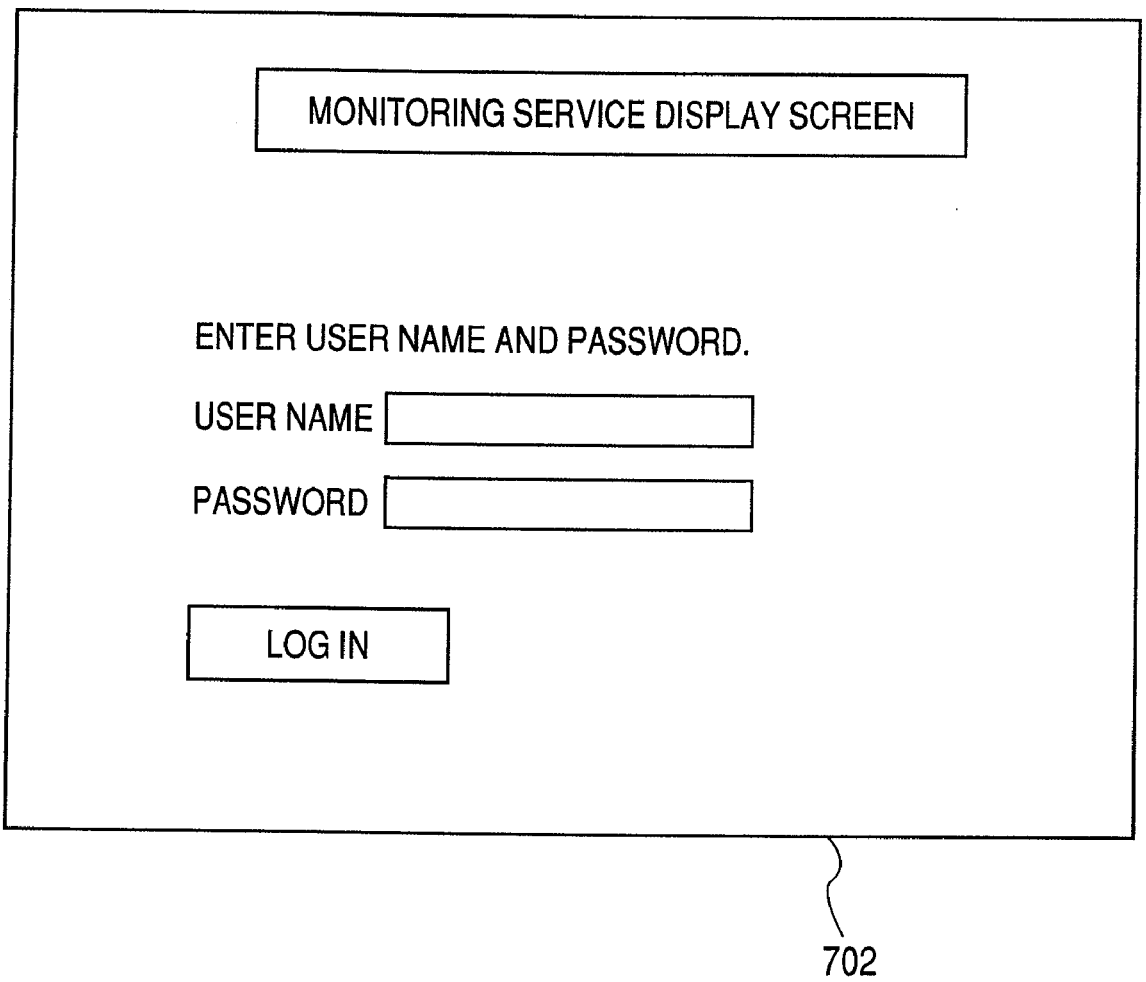
FIG. 13 is a diagram illustrating a monitoring service display screen at the time of a log-in request in the related art.

If the result showing the refusal of the access is received, the HTML data for displaying an error message illustrated in FIG. 12 onto the management display screen 601 is formed. The formed HTML data is returned to the client PC 300 as a response to the access from the client PC 300 in step 805 mentioned above. The client PC 300 which received such a response allows a management display screen 603 of a state where the error message illustrated in FIG. 12 has been displayed to be displayed on the WEB browser.

The browser on the client PC 300 which received the response from the image forming apparatus 100 in step 808 mentioned above automatically starts the access to the monitoring service display screen of the monitoring host 310 in step 809 in response to a redirect instruction in the received HTML data. Specifically speaking, by using a post method of HTTP, the URL in the meta data is designated and the monitoring host 310 is accessed.

Figure 11:
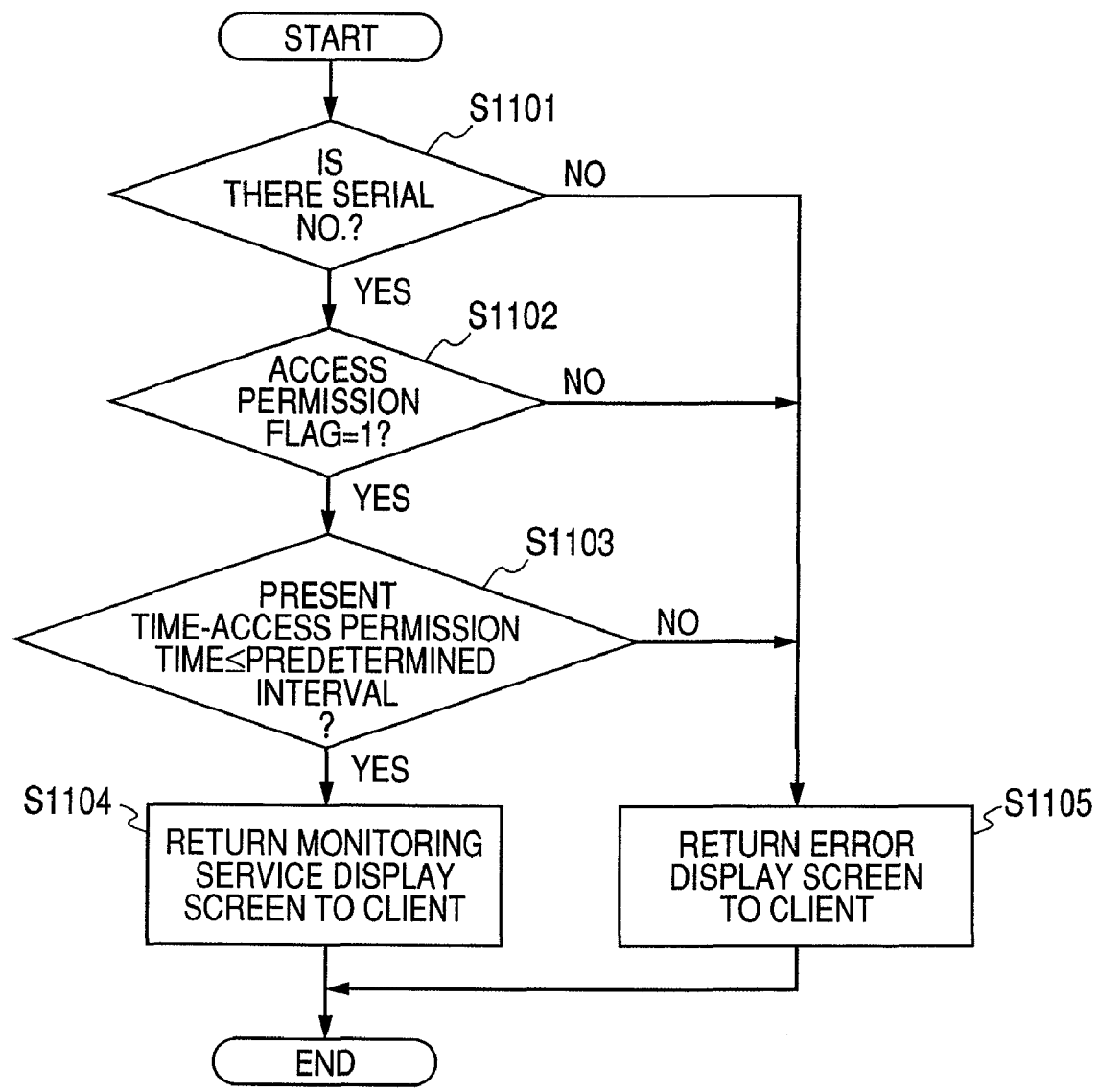
FIG. 11 is a flowchart illustrating processes on the monitoring host side upon reception of a monitoring service display screen accessing request from the client PC of the invention.

The monitoring host 310 which received the access from the client PC 300 mentioned above decodes URL parameter designated in the post method and obtains the serial number of the image forming apparatus 100. Subsequently, processes are executed according to a processing flow illustrated in FIG. 11 and a result is returned to the image forming apparatus 100 in step 810. First, whether or not the serial number "4EZ07F149" obtained exists in the device serial number column 402 in the information management table 401 is discriminated in step 1101. If the serial number "4EZ07F149" exists, the state of the access permission flag is confirmed with reference to the access permission flag column 404 of the relevant record in step 1102. If the access permission flag is equal to "1", a time difference between the time stored in the access permission time column 405 of the relevant record and the present time is calculated in step 1103. The time difference is compared with a predetermined time interval. The predetermined time interval is set to a value within a range from a few seconds to about ten and a few seconds which has predetermined on the monitoring host 310 side. As a result of the comparison, if the time difference lies within the predetermined time interval, the access is determined to be the authorized access which is made by the user having the user ID in the user ID column 403 of the relevant record. All device serial numbers concerned with the user ID in the information management table 401 are used as display targets and the HTML data of the monitoring service display screen 701 is formed. In the embodiment, the user ID of the relevant record is "Customer001" and the device serial numbers concerned with the user ID are "4EZ07F149" and "4GUP240F1". This means that information of all devices which are managed by the user having the user ID of "Customer001" is displayed on the monitoring service display screen 701. Further, the formed HTML data is returned to the client PC 300 in step 1104. The monitoring service display screen is displayed by the browser on the client PC 300. Therefore, the user can browse the monitoring service display screen without making a log-in to the monitoring service.

If any one of the discrimination results of steps 1101, 1102, and 1103 is NO, in step 1105, the monitoring host 310 designates "404 (Not Found)" into a response code of HTTP and returns it to the client PC 300. The browser on the client PC 300 which received the response code displays an error message defined on the browser side and notifies the user that the access to the monitoring service display screen has failed.

The processing sequence according to the invention which is executed in the case of displaying the monitoring service display screen 701 from the client PC 300 has been described in detail above. Finally, a validity of the discriminating method in step 1103 in FIG. 11 will be described hereinbelow.

The monitoring host 310 sets the time into the access permission time column in the information management table 401 only when it has received the accessing request from the image forming apparatus 100 in step 806 in FIG. 8. This is because since the accessing request is made by using the dedicated command specified between the image forming apparatus 100 and the monitoring host 310 and a communicating path has also been encrypted by SSL, someone else cannot assume the accessing request. Further, the image forming apparatus 100 issues the accessing request only when it has received the accessing request in step 805 from the client PC 300 which can directly access the management display screen 601 of the image forming apparatus 100. That is, the time is set into the access permission time column 405 in the information management table 401 only by the operation from the user who can operate the client PC 300 existing on the same Intranet as that of the image forming apparatus 100.

Since the foregoing processes of steps 807, 808, and 809 are almost momentarily executed, the time difference between the access permission time in the information management table 401 and the present time which is referred to by the monitoring host 310 in step 1103 is very small. The user can directly refer to the contents of, for example, the redirect instruction received as a response from the image forming apparatus 100 in step 808. Therefore, by previously storing the redirect instruction contents and separately designating from the browser, the user can try to access the monitoring service display screen of the monitoring host 310 at arbitrary time from the client PC 300 existing at an arbitrary position. In this case, however, it is practically impossible that the time difference between the access permission time and the present time in the discriminating process of step 1103 mentioned above lies within the range from a few seconds to ten and a few seconds. That is, it is practically impossible that the someone else assumes the redirect instruction and tries to access the monitoring service display screen.

From the above reasons, it is an appropriate method that the authorized access is discriminated by step 1103 mentioned above.

According to the embodiment of the invention described above, when the user accesses the monitoring service display screen 701 of the monitoring host 310, the authenticating operation using the log-in account can be omitted while assuring the security. Thus, the user or the operator of the monitoring host 310 does not need to make a troublesome management of the log-in account.

Other Embodiments

The invention can be also embodied by, for example, a system, an apparatus, a method, a program, a storing medium, or the like. Specifically speaking, the invention can be applied to a system constructed by a plurality of apparatuses or may be applied to an apparatus constructed by one equipment.

The invention incorporates the case where a program of software is supplied to a system or an apparatus directly or from a remote place and a computer of the system or the apparatus reads out and executes codes of the supplied program, so that the functions of the embodiment mentioned above are accomplished. In this case, the supplied program is the program corresponding to the flowcharts illustrated in the diagrams in the embodiment.

Therefore, the program codes themselves which are installed into the computer in order to realize the functions and processes of the invention by the computer also realize the invention. That is, the program codes themselves to realize the functions and processes of the invention are also incorporated in the invention.

In such a case, any one of object codes, a program which is executed by an interpreter, script data which is supplied to an OS, and the like can be used so long as it has the functions of the program.

The following media can be mentioned as recording media for supplying the program: for example, a floppy (registered trademark) disk; a hard disk; an optical disk; a magnetooptic disk; an MO; a CD-ROM; a CD-R; a CD-RW; a magnetic tape, a non-volatile memory card; a ROM; a DVD (DVD-ROM, DVD-R); and the like.

As another program supplying method, there can be mentioned a method whereby a client computer is connected to a Homepage of the Internet by using a browser of the client computer and the computer program of the invention is downloaded from the Homepage to a recording medium such as a hard disk or the like. In such a case, the program which is downloaded may be a compressed file including an automatic installing function. The program supplying method can be also realized by a method whereby the program codes constructing the program of the invention are divided into a plurality of files and the files are downloaded from the different Homepages. That is, a WWW server for allowing a plurality of users to download the program file for realizing the functions and processes of the invention by the computer is also incorporated in the invention.

It is also possible to use a form in which the program of the invention is encrypted, stored into a recording medium such as a CD-ROM, and distributed to the users. In such a case, it is also possible to use such a construction that the user who can clear a predetermined condition is allowed to download key information for decrypting the encryption from the Homepage through the Internet, the encrypted program is executed by using the key information, and the program is installed into the computer.

The invention incorporates not only the case where the computer executes the read-out program, so that the functions of the embodiment mentioned above are realized but also the case where the functions of the embodiment are realized based on instructions of the program in cooperation with the OS or the like which is operating in the computer. In this case, the OS or the like executes a part or all of actual processes and the functions of the embodiment mentioned above are realized by those processes.

Further, the program supplying method can be also realized by a method whereby the program read out of the recording medium is written into a memory provided for a function expanding board inserted into the computer or a function expanding unit connected to the computer and a part or all of the functions of the embodiment mentioned above are realized. In this case, after the program was written into the function expanding board or the function expanding unit, a CPU or the like provided for the function expanding board or the function expanding unit executes a part or all of the actual processes based on instructions of the program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-344283, filed Dec. 21, 2006, which is hereby incorporated by reference herein in its entirety.

What is claimed is:

1. An image forming apparatus which is communicatably connected to a monitoring server and a client apparatus,
   wherein the monitoring server has a WEB server which obtains, from the image forming apparatus, at least one of print sheet information showing a number of print sheets used in the image forming apparatus, fault information on errors in the image forming apparatus and consumable information in the image forming apparatus, and which generates service screen information from the obtained information,
   wherein the client apparatus has a browser for browsing the service screen information,
   the image forming apparatus comprising:
   a reception unit constructed to receive, from the client apparatus, a request for screen information to be displayed on a remote UI for reviewing an operating status of the image forming apparatus;
   an inquiry unit constructed to make an inquiry to the monitoring server, based on identification information for identifying the image forming apparatus, about whether an access right to the service screen information provided by the monitoring server is set for the image forming apparatus, if the reception unit receives the request from the client apparatus,
   wherein, in response to the inquiry made by the inquiry unit, the monitoring server determines whether the access right to the service screen information is set for the image forming apparatus, based on the identification information for identifying the image forming apparatus, and sends a determination result to the image forming apparatus,
   a generation unit constructed to generate the screen information for the remote UI including a link for accessing the WEB server of the monitoring server, if the determination result from the monitoring server shows that the access right to the service screen information is set for the image forming apparatus, and generate the screen information for the remote UI including no link for accessing the WEB server of the monitoring server, if the determination result from the monitoring server shows that the access right to the service screen information is not set for the image forming apparatus;
   a provision unit constructed to provide the client apparatus with the screen information generated by the generation unit; and
   an instruction unit constructed to send a URL of the WEB server of the monitoring server to the client apparatus to allow the browser of the client apparatus to display the service screen information and to give an instruction instructing the client apparatus to access the WEB server of the monitoring server, in response to reception from the client apparatus of selection information indicating that the link is selected on the remote UI displaying the screen information provided by the provision unit.

2. The image forming apparatus according to claim 1, wherein the image forming apparatus transmits a serial number of the image forming apparatus to the monitoring server in response to the reception of the selection information, and receives access permission information from the monitoring server if an authentication process based on the transmitted serial number is successfully made in the monitoring server, and wherein the instruction unit gives the instruction in response to reception of the access permission information.

3. The image forming apparatus according to claim 2, wherein the image forming apparatus receives access inhibition information from the monitoring server if an authentication process based on the transmitted serial number is not successfully made in the monitoring server, and the provision unit provides the client apparatus with the screen information for displaying an error message on the remote UI.

4. The image forming apparatus according to claim 2, wherein in sending the URL of the WEB server of the monitoring server to the client apparatus, the instruction unit adds, to the end of the URL, information generated by encrypting the serial number of the image forming apparatus.

5. A method for an image forming apparatus which is communicatably connected to a monitoring server and a client apparatus,
   wherein the monitoring server has a WEB server which obtains, from the image forming apparatus, at least one of print sheet information showing a number of print sheets used in the image forming apparatus, fault information on errors in the image forming apparatus and consumable information in the image forming apparatus, and which generates service screen information from the obtained information,
   wherein the client apparatus has a browser for browsing the service screen information,
   the method comprising:
   a reception step of receiving, from the client apparatus, a request for screen information to be displayed on a remote UI for reviewing an operating status of the image forming apparatus;
   an inquiry step of making an inquiry to the monitoring server, based on identification information for identifying the image forming apparatus, about whether an access right to the service screen information provided by the monitoring server is set for the image forming apparatus, if the request from the client apparatus is received in the reception step,
   wherein, in response to the inquiry made in the inquiry step, the monitoring server determines whether the access right to the service screen information is set for the image forming apparatus, based on the identification information for identifying the image forming apparatus, and sends a determination result to the image forming apparatus,
   a generation step of generating the screen information for the remote UI including a link for accessing the WEB server of the monitoring server, if the determination result from the monitoring server shows that the access right to the service screen information is set for the image forming apparatus, and generating the screen information for the remote UI including no link for accessing the WEB server of the monitoring server, if the determination result from the monitoring server shows that the access right to the service screen information is not set for the image forming apparatus;

a provision step of providing the client apparatus with the screen information generated by the generation step; and an instruction step of sending a URL of the WEB server of the monitoring server to the client apparatus to allow the browser of the client apparatus to display the service screen information and giving an instruction instructing the client apparatus to access the WEB server of the monitoring server, in response to reception from the client apparatus of selection information indicating that the link is selected on the remote UI displaying the screen information provided by the provision step.

6. The method according to claim 5, further comprising a transmission step of transmitting a serial number of the image forming apparatus to the monitoring server in response to the reception of the selection information, and receiving access permission information from the monitoring server if an authentication process based on the transmitted serial number is successfully made in the monitoring server, and wherein the instruction step gives the instruction in response to reception of the access permission information.

7. The method according to claim 6, the method further comprising a second receiving step of receiving access inhibition information from the monitoring server if an authentication process based on the transmitted serial number is not successfully made in the monitoring server, and the provision step provides the client apparatus with the screen information for displaying an error message on the remote UI.

8. The method according to claim 5, wherein in sending the URL of the WEB server of the monitoring server to the client apparatus, the instruction step adds, to the end of the URL, information generated by encrypting the serial number of the image forming apparatus.

9. A non-transitory computer-readable storage medium storing a computer-executable program for an image forming apparatus which is communicatably connected to a monitoring server and a client apparatus, wherein the monitoring server has a WEB server which obtains, from the image forming apparatus, at least one of print sheet information showing a number of print sheets used in the image forming apparatus, fault information on errors in the image forming apparatus and consumable information in the image forming apparatus, and which generates service screen information from the obtained information, wherein the client apparatus has a browser for browsing the service screen information, the program comprising:

a reception step of receiving, from the client apparatus, a request for screen information to be displayed on a remote UI for reviewing an operating status of the image forming apparatus;

an inquiry step of making an inquiry to the monitoring server, based on identification information for identifying the image forming apparatus, about whether an access right to the service screen information provided by the monitoring server is set for the image forming apparatus, if the request from the client apparatus is received in the reception step, wherein, in response to the inquiry made in the inquiry step, the monitoring server determines whether the access right to the service screen information is set for the image forming apparatus, based on the identification information for identifying the image forming apparatus, and sends a determination result to the image forming apparatus, a generation step of generating the screen information for the remote UI including a link for accessing the WEB server of the monitoring server, if the determination result from the monitoring server shows that the access right to the service screen information is set for the image forming apparatus, and generating the screen information for the remote UI including no link for accessing the WEB server of the monitoring server, if the determination result from the monitoring server shows that the access right to the service screen information is not set for the image forming apparatus;

a provision step of providing the client apparatus with the screen information generated by the generation step; and an instruction step of sending a URL of the WEB server of the monitoring server to the client apparatus to allow the browser of the client apparatus to display the service screen information and giving an instruction instructing the client apparatus to access the WEB server of the monitoring server, in response to reception from the client apparatus of selection information indicating that the link is selected on the remote UI displaying the screen information provided by the provision step.

10. The computer-readable storage medium according to claim 9, the program further comprising a transmitting step of transmitting a serial number of the image forming apparatus to the monitoring server in response to the reception of the selection information, and receiving access permission information from the monitoring server if an authentication process based on the transmitted serial number is successfully made in the monitoring server, and wherein the instruction step gives the instruction in response to reception of the access permission information.

11. The computer-readable storage medium according to claim 10, the program further comprising receiving access inhibition information from the monitoring server if an authentication process based on the transmitted serial number is not successfully made in the monitoring server, and the provision step provides the client apparatus with the screen information for displaying an error message on the remote UI.

12. The computer-readable storage medium according to claim 9, wherein in sending the URL of the WEB server of the monitoring server to the client apparatus, the instruction step adds, to the end of the URL, information generated by encrypting the serial number of the image forming apparatus.

* * * * *